Oct. 10, 1950      W. M. ALLISON      2,525,010
ANIMAL TRAP
Filed July 23, 1948
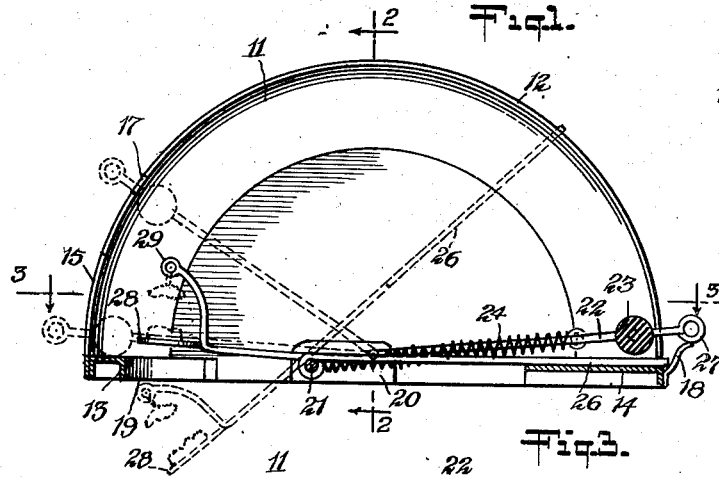
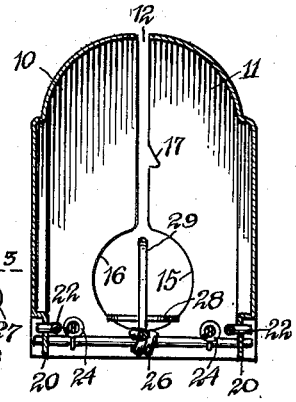
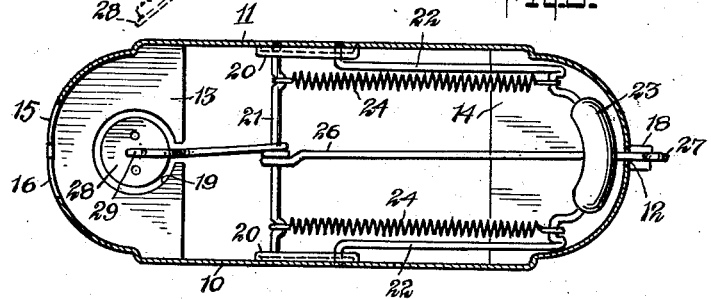
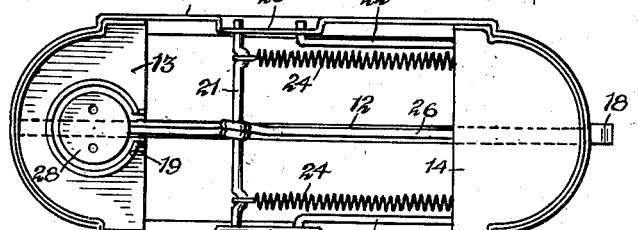
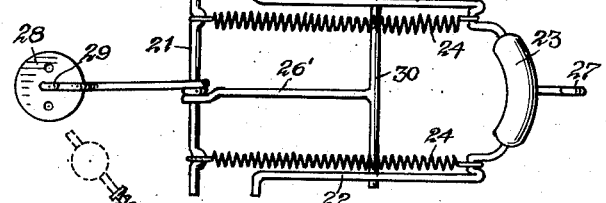
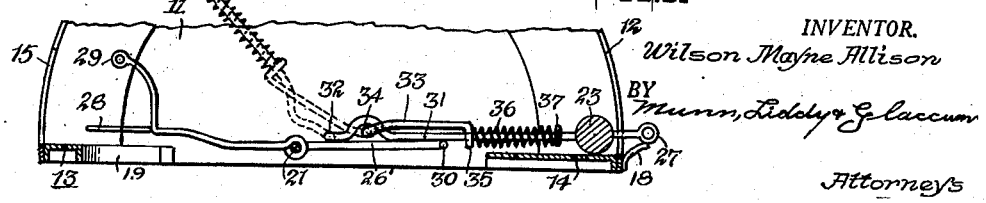
INVENTOR.
Wilson Mayne Allison
BY Munn, Liddy & Glaccum
Attorneys Patented Oct. 10, 1950

2,525,010

UNITED STATES PATENT OFFICE 2,525,010

ANIMAL TRAP

Wilson Mayne Allison, Weenen, Natal,
Union of South Africa

Application July 23, 1948, Serial No. 40,200
In the Union of South Africa February 6, 1948

3 Claims. (Cl. 43—83.5)

This invention relates to new and useful improvements in animal traps and has particular reference to one in which the trap is sprung by the animal himself and is particularly designed for rodents.

A main object of the invention is to provide a simple, inexpensive, strong, durable trap which is easily set and baited and at the same time is extremely sensitive to be released or sprung by the slightest contact of the animal with the bait.

A further object is to provide a trap which is especially adaptable to kill small animals such as mice and rats and will not be dangerous to larger animals.

A still further object is to provide a device which can be very readily set and baited and moved to any desired place.

Further and more specific objects, features and advantages will more clearly appear from a consideration of the detailed specification hereinafter set forth, especially when taken in connection with the accompanying drawing which illustrates present preferred forms which the invention may assume and which forms part of the specification.

In brief and general terms the invention comprises a housing to be placed on the floor containing a narrow opening for the head of the animal to be killed. Disposed within the housing adjacent the opening is a platform on which is disposed suitable bait and this platform is connected to a pivoted lever or arm, the other end of which is disposed when moved by the pressure of the animal's body or weight on the platform to engage and trip a striker element which is under the influence of a spring and which when released will pivot from a set position around in a rapid swinging motion to impact the head or neck of the animal.

A housing preferably is provided with a narrow peripheral slot extending from the opening and through this slot projects the end of the striker element so that it can be manipulated to be moved to one position or another. Preferably the striker element is a wire frame having a hammer portion and pivoted around a predetermined axis. Connected to this striker frame is a resilient element in the form of a spring which at its other end is connected to another point. When the striker frame is moved to a set position, the spring is so related thereto that the force exerted by the spring on the striker frame is directed along a line to one side of the pivot axis of said frame and tends to hold the frame in the set position. When the animal moves the platform and consequently moves the end of the lever connected thereto, this engages the frame and moves it around its pivot point so that thereafter a point is reached where the force of the spring is exerted along a line on the other side of the pivot point of the striker frame thus creating a force-moment which swings the striker frame with suitable force around its axis and thereby swings the hammer portion to a point adjacent the platform to strike the head or neck of the animal.

In further particulars the housing is provided with a plate disposed below the bait platform which is suitably apertured and slotted to permit the bait platform to be swung down further, whereby bait may be readily placed in position thereon. It further includes a simple means for latching the striker frame in a position intermediate its extreme end positions to enable the bait platform to be moved for the renewal or replenishment of the bait. The construction is also such as to permit the spring or resilient member to be used either in state of tension or extension or in a state of compression as the circumstances may seem to require.

Present preferred forms which the invention may assume are shown in the drawings of which—

Fig. 1 is a vertical, longitudinal section through the device;

Fig. 2 is a vertical cross section taken on the line 2—2 of Fig. 1;

Fig. 3 is a horizontal cross section taken on the line 3—3 of Fig. 1;

Fig. 4 is an inverted plan view of the device;

Fig. 5 is a modified form of the operating elements removed from the casing; and Fig. 6 is a partial vertical section through a still further modified form of the device.

Referring now merely to the specific forms shown in the drawing, it will be seen that I have formed a housing by taking a shallow cup-shaped circular pan or dish and have cut it diametrically. Taking these two semi-circular portions 10 and 11 I have placed them adjacent each other as shown in Figs. 1 and 2 with a narrow space or slot 12 therebetween. I have connected them along the bottom diameter by welding therebetween at each end plates 13 and 14. At one end of this slot 12 the adjacent edges of the sections 10 and 11 are cut away at 15 and 16 to form an enlarged opening. Above the entrance opening one side of the slot 12 is notched as at 17 for a purpose to be mentioned.

At the opposite end of the housing on the outside thereof is welded or otherwise fastened a stop piece or lip 18 in line with the end of the slot 12. This strip of metal 18 is preferably flexible and determines the set position of the striker frame by reason of its contact with the extension 27 thereof. Since the setting position should be very nicely balanced, the flexibility in this strip 18 permits it to be bent one way or the other to determine the exact set position.

Connecting plate 13 (Fig. 3) is provided with an opening 19 extending to the inner edge thereof. Side walls of these housing sections near the bottom thereof are recessed as at 20 to provide bearing surfaces for the ends of a cross rod 21, and the ends of the legs 22 of a U-shaped striker frame preferably made of wire which along the base thereof has a striker head 23 thereon. Spring members 24 of the extension type are connected at respective ends to the base of the striker frame and at their other ends to the cross bar 21. It will be noted in Fig. 1 that the axis of the cross bar 21 is slightly below the axis around which the striker frame pivots. A lever 26 is coiled around the bar 21 and its one end lies, as shown in Fig. 1, beneath the striker head 23. The other end of the lever 26 is integrally connected to a platform 28 and is also bent upwardly to an end portion 29 disposed over this platform 28. Suitable bait material may be fastened or connected to the platform 28 and the end 29 as indicated in Fig. 1.

The base of the striker frame has an extended portion 27 which passes through the slot 12 and which may be manipulated so as to swing the striker frame around its pivot axis as desired. This extension 27 may rest in the notch 17 as indicated in Fig. 1 in dotted lines. This will get the frame out of the way so as to permit the bar 26 to be moved to the dotted position shown in Fig. 1 so that the platform 28 and the end 29 of the lever may be moved down through the opening 19 to a point beneath the housing in which position bait may be placed thereon or renewed as desired. When the frame is moved to the extreme right hand position with the extension 27 resting against the stop 18, this is called the "set" position and in it it will be observed that the line of force exerted on the frame by the springs 24 passes below the pivot axis of the frame and there the spring will tend to hold the frame in this "set" position.

Now when a small animal such as a mouse or a rat smells the bait and sticks his head through the entrance opening and starts to nibble at the bait, he will inevitably sooner or later depress the platform 28 which will move the other end of the lever 26 upwardly and start to swing against the striker head 23 and this will start to swing the striker frame around its axis and carry the springs with it. This lateral shifting of the outer ends of the spring, as is obvious, will shift the direction of the line of force exerted by the springs on the frame to a line on the other side of the axis of said frame and this will create a moment of force sufficient to snap the frame with the striker head 23 around counter-clockwise with considerable force in a circular line adjacent the inner wall of the housing until the striker head is moved to the dotted position shown in Fig. 1, where it will forcibly impact the head of the animal and at least stun it. After the stunned or slain animal is removed, the hand will grip the extension 27 and move the frame to the extreme right as shown in Fig. 1 in which position the spring will be past the dead center and hold the frame again in the set position.

A slightly modified form is shown in Fig. 5 in which the lever 26′ has an end portion 30 disposed at right angles to the striker frame, and the ends of this portion 30 lie under the respective legs 22 of the frame instead of lying under the striker head 23.

In the further modified form shown in Fig. 6, instead of using an extension spring I use a compression spring which achieves the same general result. In this form, the lever 26′ is of the form shown in Fig. 5. The U-shaped striker frame is provided with the legs 31 pivoted at 32 in the side walls of the housing and provided with the extension 27 and the striker head 23. Around each leg near the base of the frame is disposed a compression spring 36 bearing against a washer 37 keyed to each leg 31. The other end of each spring bears against a turned-over end 35 looped around each leg 31 and forming part of a bar 33 pivoted at 34 in the side walls. There is a spring 36 and a bar 33 for each leg 31 in this modified form of striker frame. The full line position shown in Fig. 6 represents the set position of the striker frame and the dotted line position shown in Fig. 6 illustrates the striker frame being swung around under the tendency of the spring 36 to expand for the purpose of impacting the head of the animal. In other respects the apparatus is the same as previously described.

It is obvious that this device can be made very cheaply of strong durable parts; that it is very easy to set; and that it is extremely sensitive and quick in its operation. The slightest movement of the platform to lift the end of the bar 26 will carry the spring across dead center and snap the striker head over with considerable force and with extreme rapidity. All that is necessary to be done to reset the trap is merely to move the frame to the right again. There are no parts to lift or lock, and no particular frictional resistance to overcome in releasing it.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of any one or more of the appended claims.

What I claim as my invention is:

1. An animal trap which includes a housing of semi-circular outline having a peripheral slot therein and an entrance opening formed at one end of said slot, a striker frame pivoted on an axis across the center of said housing between opposite walls thereof, a striker head on said frame, a portion of said frame extending through said slot to permit manual movement of the frame, a spring connected at one of its ends to said frame and anchored at its other end so as to lie to one side of the pivot axis of the frame when the frame is in a set position at the end of the slot opposite the entrance opening, a lever having an end adjacent the entrance opening, and a bait platform disposed on one end of said lever adjacent the entrance opening, the other end of said lever being disposed to engage the frame when the animal moves the platform to thereby move the same to shift the line of force of the spring on the frame to the other side of the pivot axis thereof.

2. An animal trap which includes a hollow housing of semi-toroidal shape having a peripheral slot therein and an entrance opening formed at one end of said slot, a U-shaped striker frame with its legs pivoted on an axis across the center of the housing along the diameter of the toroid between opposite walls thereof, a striker head on said frame disposed along the base portion thereof adjacent the curved walls of the housing, a portion of said frame extending through said slot to permit manual movement of the frame, spring means having one end thereof connected to said frame near its base, the other end of the spring means connected to a point nearer the base of the toroid than the pivot axis, whereby the force of the spring on the frame will be exerted along a line to one side of the pivot axis when the frame is disposed along the diameter of the toroid and extending away from the entrance opening, a platform for bait disposed adjacent the entrance opening within the toroid, and a lever on which said platform is mounted, said lever being pivoted between the side walls of the housing, the lever being adapted to be moved by the animal pressing on the platform to move the frame around the pivot axis and cause the force of the spring on the frame to be shifted to a line along the other side of the frame pivot axis, whereby the frame is propelled to swing the striker head in an arc toward the platform, whereby the head of the animal projecting through the entrance opening may be impacted by said head.

3. An animal trap which includes a housing having a peripheral slot with an entrance opening at one end of said slot and a stop element disposed outside the housing adjacent the other end of the slot, a striker frame pivoted on a transverse axis within the housing, a portion of said frame extending through said slot to permit manual movement of the frame, said extending portion of the frame being adapted to rest against said stop plate in a desired adjusted position, and a spring connected to said frame and adapted to hold the frame in the set position, with the extending portion bearing against said adjustable stop plate.

WILSON MAYNE ALLISON.

REFERENCES CITED

The following references are of record in the file of this patent:

UNITED STATES PATENTS

| Number | Name | Date |
| --- | --- | --- |
| 1,630,241 | Mountford | May 24, 1927 |
| 2,059,937 | Ellis | Nov. 3, 1936 |
| 2,446,486 | Nickell | Aug. 3, 1948 |